(No Model.) 3 Sheets—Sheet 1.

E. W. COOKE.
CAR WHEEL.

No. 425,932. Patented Apr. 15, 1890.

Witnesses:

Inventor:

(No Model.)   3 Sheets—Sheet 2.

E. W. COOKE.
CAR WHEEL.

No. 425,932.   Patented Apr. 15, 1890.

Witnesses:

Inventor:

ATTORNEY.

(No Model.)
E. W. COOKE.
CAR WHEEL.
No. 425,932.
3 Sheets—Sheet 3.
Patented Apr. 15, 1890.
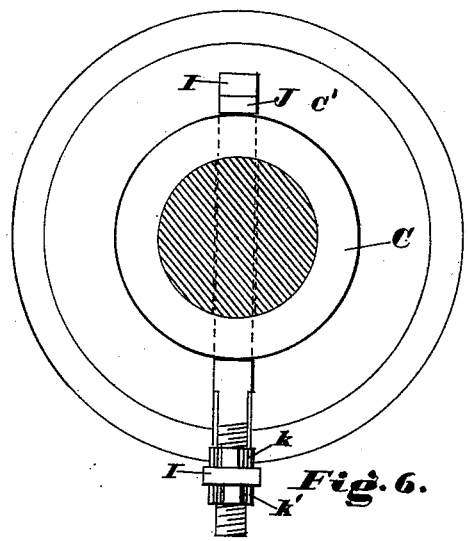
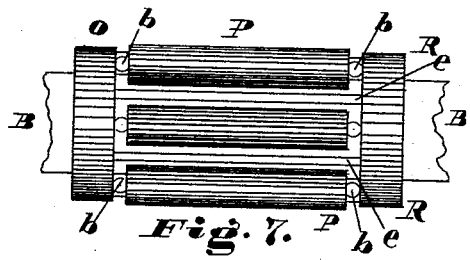
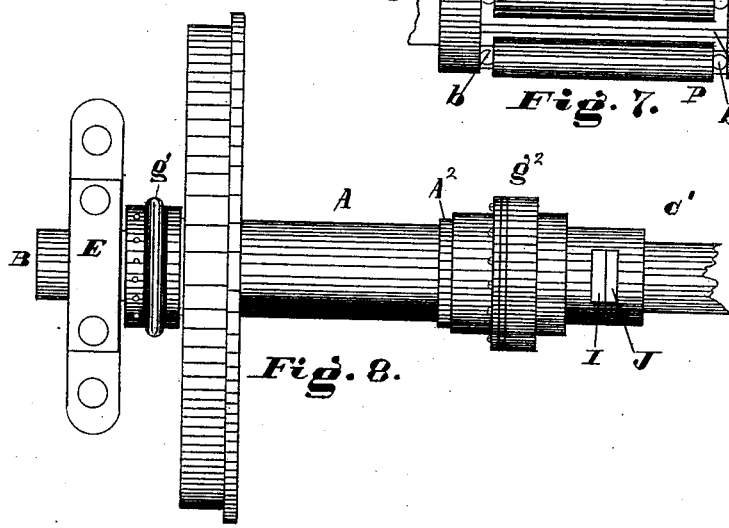
Witnesses:
Inventor:
by
ATTORNEY.

UNITED STATES PATENT OFFICE.

ERNEST W. COOKE, OF CHICAGO, ILLINOIS, ASSIGNOR TO THE AMERICAN ROLLER BEARING COMPANY, OF ILLINOIS.

CAR-WHEEL.

SPECIFICATION forming part of Letters Patent No. 425,932, dated April 15, 1890.

Application filed September 6, 1889. Serial No. 323,209. (No model.)

*To all whom it may concern:*

Be it known that I, ERNEST W. COOKE, a citizen of the United States, residing in Chicago, county of Cook, and State of Illinois, have invented a new and useful Improvement in Car-Wheels, of which the following is a specification.

My invention relates to car-wheels wherein an axle is securely fastened to the axle-box by a pin or pins and the hub of the wheel elongated and provided with a series of anti-friction bearings, one or more, as the case may require, each bearing or roller provided with a ball and angular socket at each end of the roll.

The object of my invention is to provide a roller-bearing and anti-friction car-wheel that will require no oil or other sticky or gummy lubricating material and that may be adjusted by a wedge or wedges, so that the slack, if any, may be taken up in the box and the rollers and collars kept in close proximity and in working order. I attain this object by means of the mechanism shown in the accompanying drawings, in which—

Figure 1:
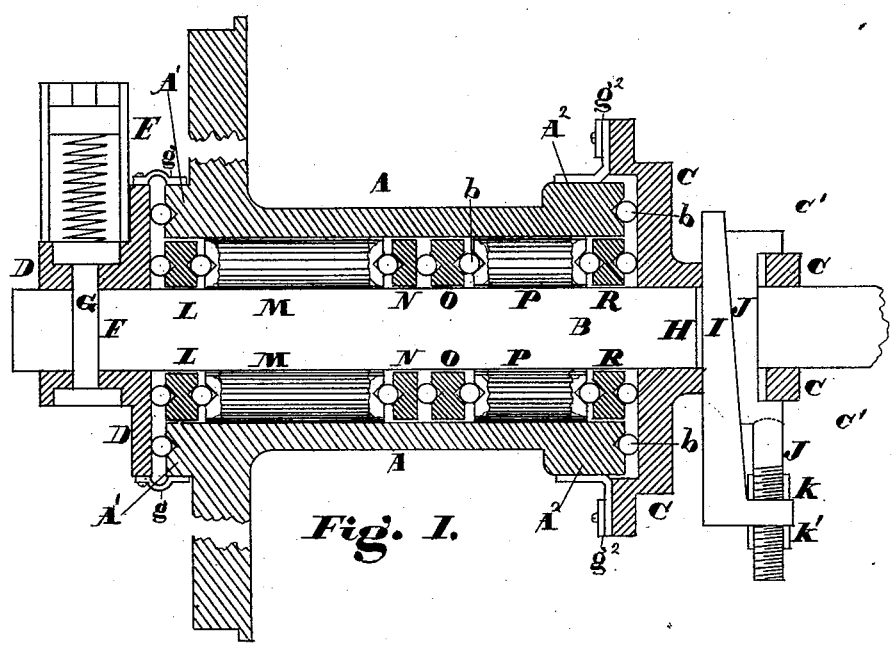
Figure 2:
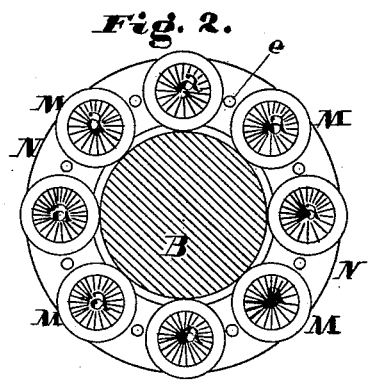
Figure 3:
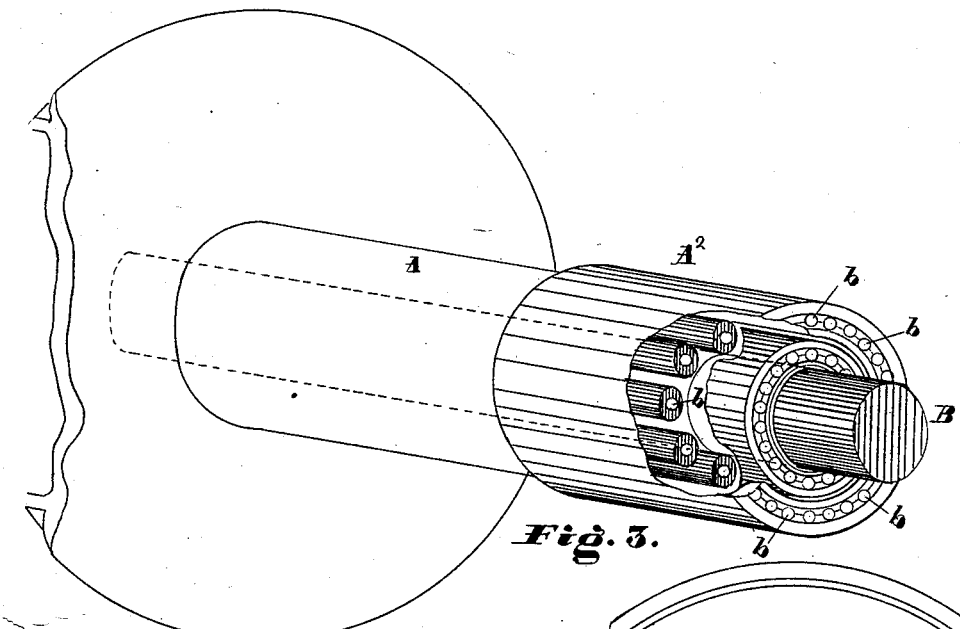
Figure 4:
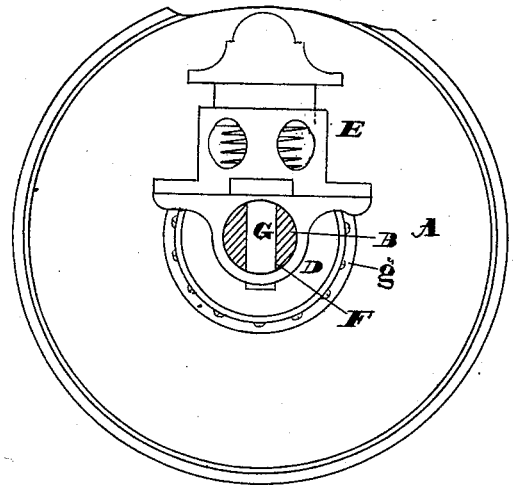
Figure 5:
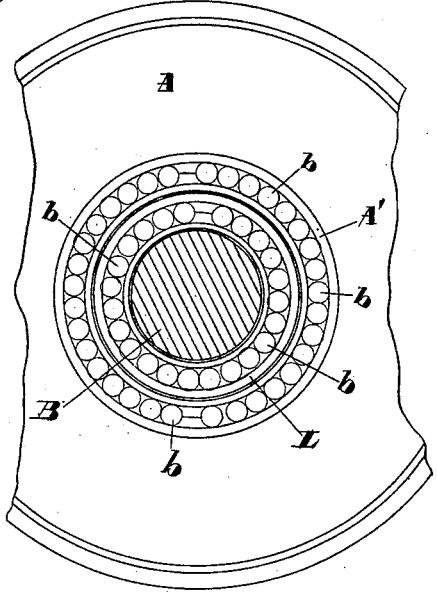

Figure 1 is a longitudinal section of the wheel and axle, showing the parts in position. Fig. 2 is a sectional view of the axle, showing an end view of one set of rollers and a collar with the stays of the cage. Fig. 3 is a view of the wheel and hub cut away so as to show the position of the rollers and the collar in position. Fig. 4 is an end view of the wheel and axle-box in position, showing the securing-pin. Fig. 5 is a sectional view of the axle and wheel on its outer face, showing the groove for carrying the series of metal balls in the collar and outer rim of the hub. Fig. 6 is a sectional view of the axle, showing the position of the "take-up" wedges in position. Fig. 7 is a plan view of one of the cages of rolls and collars with ball bearings or journals on the axle in position. Fig. 8 is a plan of the wheel, hub, take-up wedges, and axle-box, all in position.

Similar letters refer to similar parts throughout the several views.

I turn a car-axle at each end for a convenient distance down to a smooth shaft. At the outer end of the axle I cut a mortise F, which mortise F is made to accommodate the pin G, which pin G is driven through the bottom of the axle or journal box E, which for convenience of use and description is the ordinary journal-box now in use, the pin G holding the journal-box E and axle B securely together. At a proper distance from the end of the axle B and the mortise F, I make a second mortise H of a rectangular shape, and in this mortise I secure a set of take-up wedges I and J, the wedges not quite filling the mortise H in its greatest length. The wedge J is provided at the lower end with a screw-thread and two set-nuts K and K'. The upper end of the wedge J is notched, Fig. 1, so as to embrace the prolonged end of the collar C, through which it passes, and hold it fast, assisted also by the wedge I.

The wedge I has a prolonged arm at the base, which is perforated with a hole, through which passes the screw on the end of the wedge J, and is held between the nuts K and K', by which the wedges I and J are keyed up, so that any slack is taken up by their means.

On the outer end of the axle B, I make a collar D, through which passes the end of the axle B, and which, like the axle B, is perforated by a mortise for the accommodation of the pin G, which pin G secures the axle or journal box E, collar D, and axle B all firmly together. This inner end of the collar D is expanded into a broad flange, which is carried out to a distance equal to the flange A' of the hub of the wheel A. This collar D has the surface of the flange next to the wheel A turned down with a smooth face, on which roll the balls b, running in the V-grooves in the rolls L L and the end of the hub A'. On the outer margin of the flange of the collar D, I secure a cylindrical corrugated leather collar g, which bridges over the space between the collar D and the hub A' and prevents the entrance of dirt to the axle B and hub A'. At the opposite end of the hub A', as A², I make a second collar C, which is, like the collar D, mortised and secured to the axle B by the take-up wedges I and J; but, unlike the collar D, which is fixed, the collar C has a more or less fore-and-aft play to allow for the take-up by the wedges I and J. The inner surface of the collar C is turned off smooth and constructed so as to allow of the free running of the balls b in the V-shaped grooves in the face of the collar A² on the hub of the wheel A. On the outer margin of the collar C is a cylindrical collar g², of leather, to keep out the dust and dirt from the end of the hub A² of the wheel A.

The hub of the wheel A, I elongate to the required distance, and on the outer face I turn a smooth surface in which I turn an angular groove of a V or cylindrical shape, and in this groove I place a number of metallic balls, which while they roll in the said groove also roll against the smooth face of the collar D. On the other end of the hub, as A², I turn down a smooth surface and turn in the face next to the collar C an angular groove, which I fill to a greater or less extent with metallic balls b, which while they roll in the groove also play against the surface of the collar C next to them.

The core of the hub is bored out so that it will accommodate a series of collars and rollers aggregated together in cages, or free, as the case may be, for instance. Within the outer end A' of the wheel and within and concentric with it I make a collar L, which is smaller in diameter than the hole in the core of the hub A and longer than the axle B, about which it revolves. This collar L is turned with an angular or cylindrical groove in the vertical face on the outer side. The groove is filled to a greater or less extent with metallic balls b. Adjoining the collar L are a series of rollers M M, which are of a diameter equal to the space between the axle B and the inner surface of the core of the wheel A. Both ends of the rollers M M are turned with a conical or angular pit a of any angle desired, into which fits one of the metallic balls b, which ball b acts as the pinion for the rollers M M. The inner face of collar L is turned with a series of conical or angular pits similar to those marked a in the ends of the rollers M, into which pits fits a ball of metal b and having a like function. Adjoining the rollers M M is a second collar N, which is of the same size as the collar L and in every way similar, except that on the inner side or face turned toward the collar O the face is turned up smooth, and against this the balls b of the collar O roll. Between the collars L and N are brace-rods e to hold the collars together and secure the rollers M in place.

Within the core of the hub A and toward the inner end of the hub is a second cage of rollers similar to that composed of the collars L and N and the rollers M, and balls b, composed of the collar O, rollers P P, and collar R, with the balls b, the only difference being that the outer face of the collar O has an angular or other shaped groove turned in it. In this groove is a series of metallic balls b, the last collar R being similar to the first one L, and the balls it carries rolling against the smooth surface of the collar C, as described.

Having thus described the parts of my invention, I now proceed to explain the method of operating the same. I put the collar C in place on the axle B so that the mortise C' is in juxtaposition with the mortise H, and I then put in the take-up wedges I and J. The cages O P R (I apply this term "cage" to this series of collars and rollers for convenience) is placed in the core of the hub A, so that the balls in the collar R on the inner surface will roll against the smooth face of the collar C. The case N M L is then put in the core, so that the balls in the outer groove of the collar L will roll against the smooth surface of the collar D. The wheel is then put on the axle so that the balls in the collar A² of the hub shall roll against the smooth surface of the collar C and the balls b of the collar A' of the hub will roll against the smooth surface of the collar D. The collar D is then placed on the axle so that the mortise F in the axle will admit of the pin G securing the axle-box E, collar D, and axle B all together. Any slack is then taken up, and when the balls, collars, and rollers have been anointed with plumbago the axle and wheel are ready for use.

I am fully aware that prior to my invention car-wheels with roller-bearings have been in use, and I do not, therefore, lay claim to the broad principle of roller-bearings on car-wheels; but What I do claim, and desire to secure by Letters Patent, is—

1. In a car-wheel, the combination of a mortised axle to which is secured a collar carrying the axle or journal box, and a collar removed from the journal-box, mortised to hold the take-up wedges, with a car-wheel having a series of cages composed of collars and rollers provided with balls as pinions and journals, all substantially as and for the purpose set forth and described.

2. In a car-wheel, the combination of a mortised axle with a stationary collar pinned to the outer end of the axle and secured to the journal-box, with a loose collar secured to the axle by means of take-up wedges, and a loose wheel running about the said axle, all substantially as and for the purpose set forth and described.

3. In a car-wheel, the combination of a series of collars and rollers running within a hollow core in the middle of the hub of the wheel, the said collars being of less diameter than the core, and the rollers having a diameter equal to the space between the axle and the sides of the core, the said collars carrying a row of balls in an angular or cylindrical groove, and the rollers carrying a ball at each end in a conical pit, said rollers and collars secured in cages in series, with a hollow-cored hub having a flange at each end, carrying a row of balls in an angular or cylindrical groove in the face of said flange, and running against a fixed and movable collar secured to the axle, all as and for the purpose set forth and described.

4. In a car-wheel, the combination of a stationary collar and a movable collar attached to an axle, said collar being provided with a cylindrical leather collar, with a loose wheel and hub running on an axle by means of a series of collars and rollers and balls, all substantially as set forth and described.

5. In a car-wheel, the combination of a cage to revolve within the hub of the wheel, consisting of a collar of a cylindrical form provided with an angular or cylindrical groove turned in the outer and inner surfaces and carrying a row of metallic balls, with a series of rollers carrying a conical pit at each end of the same, into which fits the metallic ball of the collar, all arranged and operating substantially as set forth.

ERNEST W. COOKE.

In presence of:—
    H. HAUPT, Jr.,
    T. E. SHEEHE.